United States Patent
Flick et al.

(10) Patent No.: US 11,130,425 B2
(45) Date of Patent: Sep. 28, 2021

(54) ACTUATION MECHANISM FOR A LONGITUDINAL ADJUSTER, LONGITUDINAL ADJUSTER FOR A VEHICLE SEAT, AND VEHICLE SEAT

(71) Applicant: ADIENT ENGINEERING AND IP GMBH, Burscheid (DE)

(72) Inventors: Joachim Flick, Hueckeswagen (DE); Erik Sprenger, Wermelskirchen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 0 days.

(21) Appl. No.: 16/643,985

(22) PCT Filed: Sep. 6, 2018

(86) PCT No.: PCT/EP2018/073941
§ 371 (c)(1),
(2) Date: Mar. 3, 2020

(87) PCT Pub. No.: WO2019/048519
PCT Pub. Date: Mar. 14, 2019

(65) Prior Publication Data
US 2021/0061137 A1    Mar. 4, 2021

(30) Foreign Application Priority Data
Sep. 6, 2017  (DE) ............. 10 2017 215 640.6

(51) Int. Cl.
*B60N 2/08*  (2006.01)

(52) U.S. Cl.
CPC .......... *B60N 2/0887* (2013.01); *B60N 2/085* (2013.01)

(58) Field of Classification Search
CPC ...... B60N 2/06; B60N 2/0705; B60N 2/0818; B60N 2/0825; B60N 2/085; B60N 2/0837; B60N 2/0887
See application file for complete search history.

(56) References Cited

U.S. PATENT DOCUMENTS

| | | | | |
|---|---|---|---|---|
| 6,113,051 A | * | 9/2000 | Moradell ............. | B60N 2/0705 248/430 |
| 6,637,712 B1 | * | 10/2003 | Lagerweij ............ | B60N 2/0705 248/429 |

(Continued)

FOREIGN PATENT DOCUMENTS

| DE | 69800131 T2 | 9/2000 |
|---|---|---|
| DE | 102004056430 B3 | 9/2005 |

(Continued)

OTHER PUBLICATIONS

Machine Translation of DE 102015220262A1; https://translationportal.epo.org/emtp/translate/?ACTION=description-retrieval&COUNTRY=DE&ENGINE=google&FORMAT=docdb&KIND=A1&LOCALE=en_EP&NUMBER=102015220262&SRCLANG=de&TRGLANG=en (Year: 2021).*

(Continued)

*Primary Examiner* — Ryan D Kwiecinski
(74) *Attorney, Agent, or Firm* — Marshall & Melhorn, LLC (57) ABSTRACT

An actuation mechanism for a longitudinal adjuster of a vehicle seat may have at least one actuation arm, a trigger lever, and a positioning element which is arranged on the trigger lever and which is pivotally mounted on a free lever end of the trigger lever.

9 Claims, 8 Drawing Sheets

(56) References Cited

U.S. PATENT DOCUMENTS

| | | | |
|---|---|---|---|
| 8,955,813 B2* | 2/2015 | Beneker | B60N 2/0806 |
| | | | 248/429 |
| 9,067,514 B2* | 6/2015 | Oh | B60N 2/0843 |
| 9,120,400 B2* | 9/2015 | Ruthmann | B60N 2/0868 |
| 9,162,589 B2* | 10/2015 | Dill | B60N 2/0881 |
| 9,272,639 B2* | 3/2016 | Lee | B60N 2/0875 |
| 9,481,266 B2* | 11/2016 | Kim | B60N 2/0806 |
| 9,597,981 B2* | 3/2017 | Kim | B60N 2/0806 |
| 9,764,660 B2* | 9/2017 | Takiya | B60N 2/0806 |
| 10,195,963 B2 | 2/2019 | Flick et al. | |
| 10,500,986 B2 | 12/2019 | Sprenger et al. | |
| 2004/0026975 A1* | 2/2004 | Rausch | B60N 2/0875 |
| | | | 297/344.1 |
| 2008/0251679 A1* | 10/2008 | Stoia | B60N 2/0881 |
| | | | 248/429 |
| 2008/0315662 A1* | 12/2008 | Suck | B60N 2/0806 |
| | | | 297/463.1 |

FOREIGN PATENT DOCUMENTS

| | | |
|---|---|---|
| DE | 102006021884 B3 | 10/2007 |
| DE | 102008058518 A1 | 5/2010 |
| DE | 102015220262 A1 | 2/2017 |
| WO | 2016/062592 A1 | 4/2016 |

OTHER PUBLICATIONS

Machine Translation of DE 102004056430B3; https://translationportal.epo.org/emtp/translate/?ACTION=description-retrieval&COUNTRY=DE&ENGINE=google&FORMAT=docdb&KIND=B3&LOCALE=en_EP&NUMBER=102004056430&SRCLANG=de&TRGLANG=en (Year: 2021).*

European Patent Office, International Search Report with Written Opinion, issued in PCT/EP2018073941, dated Nov. 26, 2018, 13 pages, European Patent Office, Rijswijk, Netherlands.

* cited by examiner

ACTUATION MECHANISM FOR A LONGITUDINAL ADJUSTER, LONGITUDINAL ADJUSTER FOR A VEHICLE SEAT, AND VEHICLE SEAT

The invention relates to an actuation mechanism for a longitudinal adjuster, a longitudinal adjuster for a vehicle seat, and a vehicle seat having a longitudinal adjuster of this kind.

A longitudinal adjuster of the aforementioned kind is known from DE 10 2006 021 884 B3, for example. In this case, a first seat rail connected to the vehicle structure and a second seat rail connected to the seat structure are provided, which enclose one another reciprocally and are movable relative to one another in a longitudinal direction. In addition, a rail locking device which is arranged largely within the rail profile and an unlocking flap which is arranged outside the rail profile and acts on the rail lock during actuation are provided. An actuation arrangement for a rail locking device is known from DE 10 2008 058 518 A1 which is inserted from outside into an opening in the seat rail via a lever.

The problem addressed by the present invention is that of specifying an actuation mechanism for a longitudinal adjuster, an improved longitudinal adjuster for a vehicle seat, and a vehicle seat having an improved longitudinal adjuster of this kind.

The actuation mechanism for a longitudinal adjuster of a vehicle seat according to the invention, wherein the longitudinal adjuster comprises an upper rail and a lower rail which are lockable to one another by means of at least two locking units, and wherein the actuation mechanism comprises at least one actuation arm, a release lever and a positioning element which is arranged on the release lever and which is pivotably mounted on a free lever end of the release lever.

In a possible embodiment, the positioning element is configured in the form of a rocker or is similar to a rocker. In this case, the positioning element can be preassembled on the release lever, for example mounted, latched or clipped.

In a further embodiment, the positioning element is arranged outside the rails and is operatively connected to a guide element arranged in the interior between the rails, wherein the guide element is coupled with the locking unit.

The advantages associated with the invention particularly involve the positioning element being capable of being preassembled on the release lever. In addition, complete seat side parts can be fastened to the upper rail prior to spraying and the rail can then be easily mounted. In addition, the guide element serves as a tilting angle limiter.

The positioning element is particularly configured as a rocker or a rocker-like element. A further embodiment provides that the positioning element is formed from a rigid, in particular reinforced plastic, combined with an elastomer, for example. In this way, the positioning element is designed both to guarantee the unlocking forces due to the rigid plastic and also to dampen locking and unlocking noises on account of the elastomer and for the simple fastening of the positioning element on the release lever.

By way of example, the rigid, in particular ultra-rigid, plastic can be provided with an elastic material to dampen locking or unlocking noises. In particular, the positioning element may be configured as an injection-molded component, for example a two-component injection-molded part. In this case, the positioning element may be formed from an internal elastic material and a rigid plastic surrounded by said material.

In a further embodiment, the positioning element has an attachment region in the region of the internal elastic material by means of which the positioning element is fastenable, in particular preassemblable, on the release lever in a form-fitting or force-fitting manner. For example, the attachment region of the positioning element and a coupling region of the release lever may be configured in such a manner that a plug-in snap-on connection is formed. Consequently, the positioning element can be preassembled by plugging in and snapping onto the release lever.

The locking unit is formed by two locking elements, in particular latching plates, for example. If one of the two latching plates should require a greater unlocking force, for example due to an increased longitudinal load when unlocking, the two latching plates unlock in parallel wherever possible by means of the coupling of the positioning element and guide bolts. In this case, a guide bolt is provided for each latching plate. The positioning element in the form of a rocker, for example, engages with the respective rocker end in this case on one of the guide bolts and therefore one of the latching plates for unlocking.

The invention allows easier assembly following the coating process. The locking elements, in particular latching plates, can be assembled prior to the welding or riveting of the adapter or seat side parts, and then coated too. No vertical assembly processes which may be restricted by seat side parts are then necessary following the coating process.

A further aspect envisages a longitudinal adjuster for a vehicle seat. The longitudinal adjuster comprises an upper rail and a lower rail which are lockable to one another by means of at least two locking elements and an actuation mechanism for actuating the locking elements, as previously described.

In a possible embodiment, the positioning element is arranged outside the rails and is in operative contact with at least one guide element arranged in the interior between the rails. In this case, a guide element, in particular a pin or peg, can be provided for each locking element. More than one, in particular two, guide elements can also be provided for each locking element.

Moreover, when unlocking or locking, the locking elements are forcibly guided by means of the guide element in the unlocking direction in the upper rail to prevent tilting.

The guide elements of the respective locking element are spaced apart from the rotational axis or articulated axle of the positioning element in such a manner, for example, that the positioning element centers itself when unlocking.

Furthermore, a vehicle seat with a longitudinal adjuster is provided, as has previously been described.

BRIEF DESCRIPTION OF THE DRAWINGS

Exemplary embodiments of the invention are explained in greater detail with the help of drawings. In the drawings.

DETAILED DESCRIPTION

Figure 1:
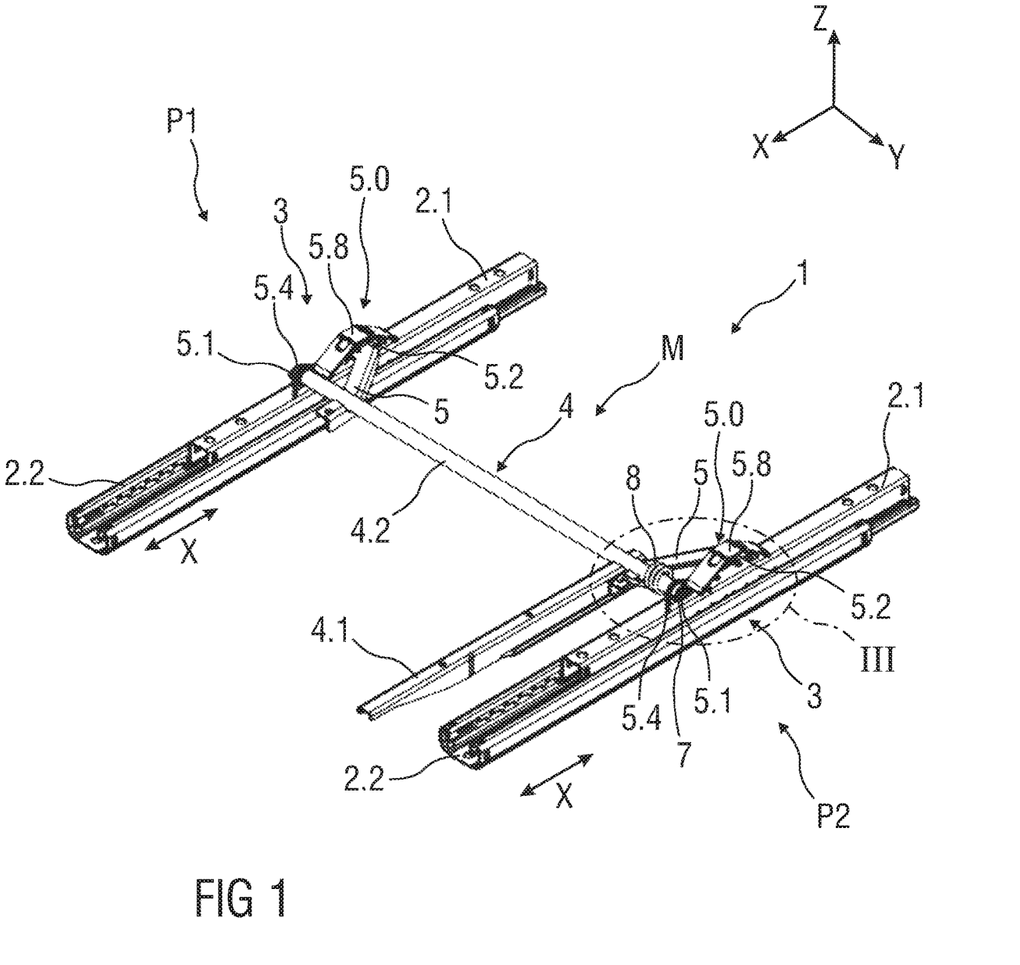
FIG. 1 shows schematically as a perspective representation two pairs of rails with an actuation mechanism for a longitudinal adjuster.

FIG. 1 shows schematically as a perspective representation a longitudinal adjuster 1 with an actuation mechanism 4.

The longitudinal adjuster 1 is used for the manual longitudinal adjustment of a seat, in particular a vehicle seat. The longitudinal adjuster 1 in this case adjusts a longitudinal seat position of the vehicle seat which is not depicted in greater detail. The longitudinal adjuster 1 comprises a rail system 2. The rail system 2 comprises two pairs of rails P1, P2 each with two rails 2.1, 2.2. A pair of rails P1 or P2 is arranged on each vehicle seat side.

In this case, one of the rails 2.1 of the respective pair of rails P1, P2 is fastened in a seat-mounted manner to the vehicle seat. The other of the rails 2.2 in each case has a vehicle-mounted design and is connected to a vehicle structure, in particular to the floor of the vehicle.

The two rails 2.1, 2.2 mutually enclose one another forming a rail profile with an interior I and are movable relative to one another in the longitudinal direction X, wherein balls (not shown) are arranged between the two rails 2.1, 2.2 to reduce friction.

The longitudinal adjuster 1 according to the invention preferably usually has two pairs of rails P1, P2, each with an upper and a lower rail as the upper rail 2.1 and lower rail 2.2.

The two rails 2.1, 2.2 are lockable to one another by means of a rail locking device 3. The rail locking device 3 is arranged within the rail profile in the interior I and may be of any design, for example a latching plate or a latching lever or a detent.

The rail locking device 3 is releasable and actuable by means of an actuation mechanism 4 which is arranged at least partially outside the rails 2.1, 2.2. The actuation mechanism 4 for the actuation, in particular unlocking or releasing, of the rail locking device 3 may be configured in different ways and comprises an actuation arm 4.1, as depicted in FIG. 1.

The actuation arm 4.1 in this case is configured as a one-arm handle. Alternatively, the actuation arm 4.1 may be configured as a hand grip (not shown in greater detail). The actuation arm 4.1 is configured in such a manner that it projects at the front end of the vehicle seat and can be actuated by a user.

The actuation mechanism 4 comprises a release mechanism 5.0. The release mechanism 5.0 is arranged between the actuation arm 4.1 and the rail locking device 3 and couples these to one another in such a manner that the rail locking device 3 is released and unlocked during actuation of the actuation arm 4.1 so that one of the rails 2.1, 2.2 can be moved relative to the other.

The release mechanism 5.0 comprises a release lever 5 which is coupled, in particular connected, at one end to the actuation mechanism 4 in particular to an actuation arm 4.1. The opposite end of the release lever 5 is coupled, in particular connected, to at least one positioning element 5.2.

The actuation arm 4.1 is connected non-rotatably to a cross bar 4.2 which is in turn mounted rotatably at one end in an attachment region 5.1 on the respective upper rail 2.1 of each pair of rails P1, P2. For this purpose, the respective attachment region 5.1 comprises a bearing bush 7 for the cross bar 4.2. The attachment region 5.1 is configured as a cleat or holding tab, for example, and fastened to the rail 2.1.

FIGS. 2 to 6 show schematically in longitudinal section one of the pair of rails P1 with an upper rail 2.1 and a lower rail 2.2 and a locking unit 3 arranged between them in the interior I and an outer positioning element 5.2 for unlocking the locking unit 3.

The positioning element 5.2 lies outside the pair of rails P1.

The rail locking device 3 in the exemplary embodiment has two locking elements 3.1 configured as latching plates which are movably arranged on one of the rails 2.1 2.2, in particular on the upper seat rail 2.1, and are each held by means of a spring 3.2 with the seat rails 2.1, 2.2 in the locked state. The springs 3.2 are designed as return springs, for example. The springs 3.2 are tensioned in the locked state (locking position VP), in order to hold the locking element 3.1 in the locked state. The springs 3.2 are further tensioned during the unlocking and adjustment of the locking elements 3.1. The spring force in the locked state is smaller in this case than the spring force in the unlocked state. The spring force in the locked state is particularly selected in such a manner that the locking element 3.1 is substantially held in a fixed state, in order to avoid rattling, for example. When the actuation arm 4.1 is released for unlocking, the locking element 3.1 is thereby automatically moved into the locked state (locking position VP) by means of the springs 3.2.

In the locked state, locking teeth 11 of the locking elements 3.1 engage with the two rails 2.1, 2.2, for example with slot-shaped rail openings 2.3, so that the rails 2.1, 2.2 are locked relative to one another and a movement of one of the seat rails 2.1 relative to the other seat rail 2.2 is blocked.

The positioning element 5.2 is arranged outside the rail profile on an outer lever end 5.3 of the release lever 5. The positioning element 5.2 is configured in such a manner that on actuation of the actuation arm 4.1 it centers, in other words symmetrically adjusts and positions, the rail locking device 3, in particular the two locking elements 3.1, in relation to one of the end positions thereof, in particular to an unlocking axis EA of an unlocking position EP (FIG. 7) or locking axis VA of a locking position VP (FIG. 2) For this purpose, the respective locking element 3.1 encloses a guide element 3.3 which, in order to unlock the respective locking element 3.1, comes into engagement with the positioning element 5.2 and is provided to limit the tilting angle of the locking elements 3.3 during unlocking or locking. The guide element 3.3 is configured as a bolt or pin, for example.

The positioning element 5.2 is articulated to the outer free lever end 5.3 of the release lever 5. The positioning element 5.2 is, in particular, pivotably mounted. In addition, the positioning element 5.2 is configured as a rocker. The positioning element 5.2 may also be configured as a two-arm lever. The respective rocker end (or lever arm) of the positioning element 5.2 in this case is assigned to a locking element 3.1.

In the exemplary embodiment, the positioning element 5.2 is configured as a substantially triangular plate or disk and has a central articulated axle 5.5 about which the positioning element 5.2 is pivotable. The positioning element 5.2 is configured in the form of a rocker, in particular a disk-shaped or plate-shaped rocker.

The disk-shaped rocker has a substantially triangular shape or a truncated pyramid shape. One of the triangle corners is flattened in design and is pivotably mounted on the release lever 5. The two other corners of the triangle or rocker ends form the bearing surface on the rail locking device 3, in particular on the two locking elements 3.1.

The positioning element 5.2 is made of plastic. In particular, the positioning element 5.2 is made of a rigid, in particular reinforced, plastic combined with an elastic material, in particular an elastomer.

In particular, the positioning element 5.2 may be configured as an injection-molded component, for example a two-component injection-molded component. In this case, the positioning element 5.2 comprises an internal elastic material 5.2.1, for example, which is surrounded by a rigid plastics material 5.2.2. This means that the positioning element 5.2 is designed to guarantee the unlocking forces on account of the rigid plastics material 5.2.2 and to dampen locking or unlocking noises on account of the elastic material 5.2.1 or elastomer.

The articulated axle 5.5 of the positioning element 5.2 is configured in the region of the internal elastic material 5.2.1 which has an attachment region 5.6 by means of which the positioning element 5.2 is fastenable, in particular preassemblable, in a form-fitting or force-fitting manner on the release lever 5.

Corresponding to the attachment region 5.6, the release lever 5 has a coupling region 5.7. For example, the attachment region 5.6 of the positioning element 5.2 and the coupling region 5.7 of the release lever 5 are configured in such a manner that a plug-in snap-on connection is formed between them. Consequently, the positioning element 5.2 can be preassembled by fitting and snapping onto the release lever 5 which is arranged outside the interior I of the seat rails 2.1, 2.2.

The actuation mechanism 4 has a release cover 5.8 in the attachment region 5.6 of the positioning element 5.2. On the inside, the release cover 5.8 has an inner contour which corresponds to the outer contour of the position element 5.2. The release cover 5.8 is configured in the shape of a stirrup, the stirrup ends of which engage, in particular latch, in a form-fitting or force-fitting manner with recesses in the upper seat rail 2.1. The release cover 5.8 may be configured in such a manner that it increases the rail strength of the upper seat rail 2.1.

The upper seat rail 2.1 has no openings in the side walls to release the rail locking device 3. This increases the rail strength.

The attachment region 5.1 and the release lever 5 are provided for coupling the actuation arm 4.1 with the rail locking device 3, so that a traditional additional unlocking lever for the rail locking device 3 can be dispensed with.

In order to unlock both pair of rails P1 and P2 and for reasons of symmetry, as shown in FIG. 1, two release levers 5 are provided which are connected to one another by means of the one actuation arm 4.1. In this case, the actuation arm 4.1 is provided with a cross bar 4.2, the ends of which are rotatably mounted in the openings 5.4. The cross bar 4.2 has a round cross section, at least in the region of the free ends.

This kind of symmetrical design of the rail system 2 and of the actuation mechanism 4 with identical release levers 5 in the pair of rails P1, P2 leads to a variant reduction as a consequence of multiple identical parts and therefore to cost-effective production.

The external actuation mechanism 4 and the external release mechanism 5.0 and the internal rail locking device 3 mean that erroneous releases are minimized. In addition, a joint external actuation arm 4.1 can be used for both external release levers 5 of the release mechanism 5.0 and both rail locking devices 3. In addition, the actuation arm 4.1, the release lever 5 and the positioning element 5.2 are preassemblable as an assembly unit M. The release cover 5.8 is fixedly connected, for example riveted, screwed, soldered, etc., to the upper rail 2.1. The actuation arm 4.1, the release lever 5 and the positioning element 5.2 are fixedly connected, for example welded, to one another.

The release lever 5 is integrally formed from metal or plastic or as a hybrid component from metal and plastic.

The release lever 5 forms a force-transmission element for the transmission and transformation of the rotation of the actuation arm 4.1 into a vertical movement of the rail locking device 3 to unlock the same. The release lever 5 and the attachment of the actuation arm 4.1 are configured in such a manner that the pivot point D of the actuation arm 4.1 is formed in the region of the upper rail 2.1.

In this case the actuation arm 4.1 may be configured as an operating lever with a cross bar 4.2 made of metal or plastic which engages with the release lever 5. Alternatively, the actuation arm may also be configured as a u-shaped stirrup or as a one-piece cross stirrup made of plastic or metal.

In order to avoid rattling noises and for the automatic holding of the actuation mechanism 4 in the passive or resting position, said mechanism is held in a spring-pretensioned manner on the rail system 2. For this purpose, a spring element 8, for example a yoke spring, a leg spring or a screw spring, is arranged between the actuation mechanism 4 and the upper rail 2.1 and thereby pretensions the actuation mechanism 4 in the resting or passive position. For example, one end of the spring element 8 is arranged, in particular placed, on the actuation arm 4.1 or on one of the release levers 5. The other end of the spring element 8 is placed on the upper rail 2.1.

The upper rail 2.1 has at least two through-openings 9 through which the rail locking device 3 is guided and fastened to the rail 2.1. Furthermore, the upper rail 2.1 has a slot opening 10 for receiving the attachment region 5.1 of the actuation mechanism 4.

In the side walls, the upper rail 2.1 has locking openings or rail openings 2.3 which correspond to locking teeth 11 of the locking elements 3.1.

FIGS. 2 to 6 show schematically as an enlarged representation the actuation mechanism 4 in the region of a release mechanism 5.0 with the release cover 5.8.

Figure 2:
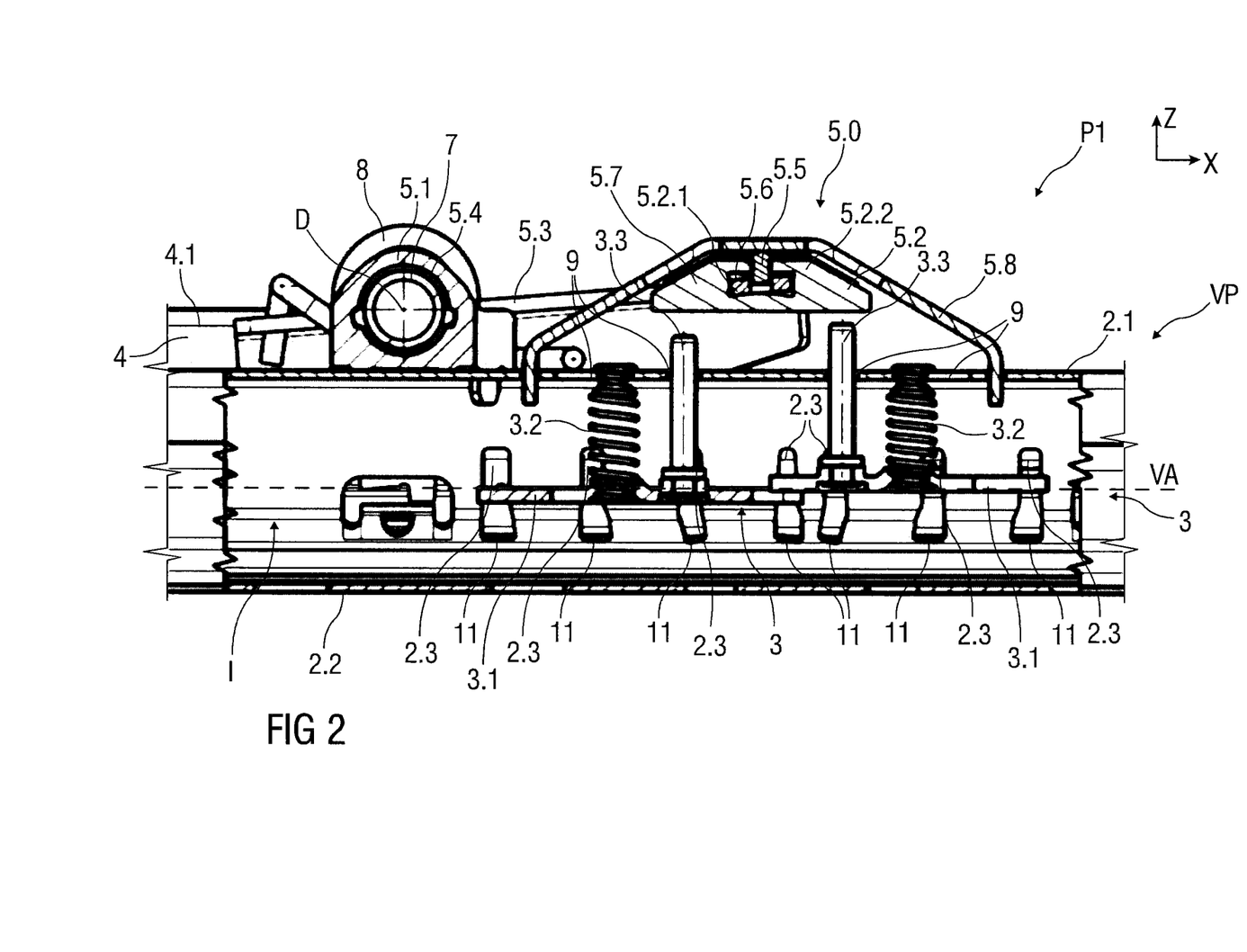
FIGS. 2 to 7 show schematically in longitudinal section a possible embodiment for an improved actuation mechanism of a longitudinal adjuster with one of the pairs of rails with an upper rail and a lower rail and a locking unit arranged in the interior between these rails and an outer positioning element for unlocking the locking unit.

FIG. 2 shows the rail locking device 3 in a locking position VP in which the locking teeth 11 of the locking elements 3.1 engage in a locking manner with the rail openings 2.3 in the two rails 2.1, 2.2. In this case, the release mechanism 5.0, in particular the positioning element 5.2, is not yet in engagement with the guide elements 3.3 of the locking elements 3.1.

For each pair of rails P1, P2, the release mechanism 5.0 comprises at least the release lever 5 and the positioning element 5.2.

Figure 3:
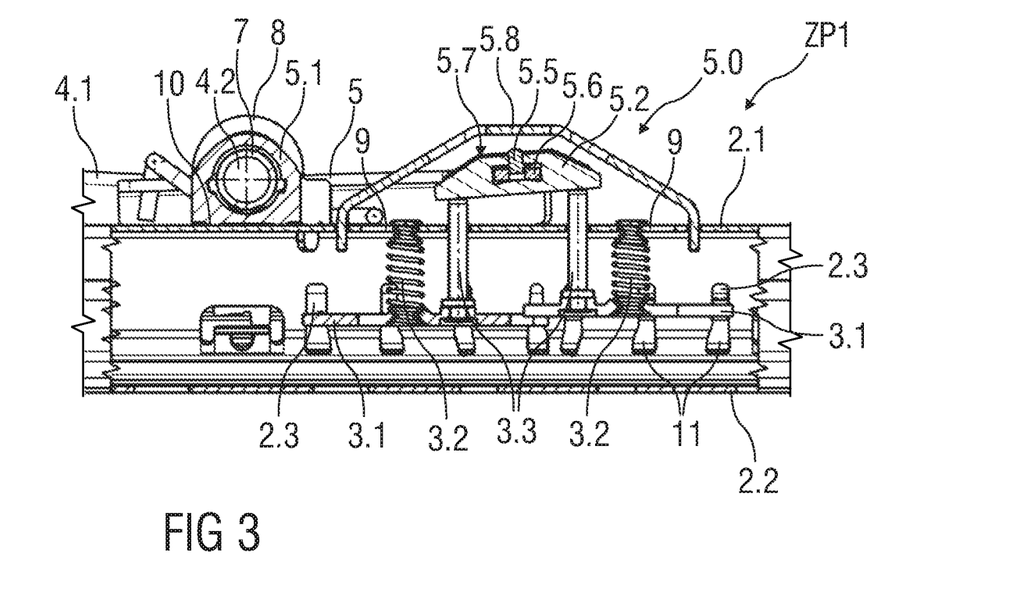

FIG. 3 shows the rail locking device 3 when releasing the release mechanism 5.0. On account of the different, in particular graduated, locking positions, the guide elements 3.3 project to different heights through the through-openings 9. The guide elements 3.3 are conducted through the through-openings 9 in a freely movable manner.

The guide element 3.3 of the play-free locking element 3.1 in each case projects higher from the through-opening. The locking mechanism is described in greater detail in international patent application WO 2016/062592 A1. In particular, the locking elements 3.1 for locking upper and lower rails 2.1, 2.2 engage therewith in a gradual locking manner, wherein in a prelocking stage the locking elements 3.1 prelock the upper and lower rails 2.1, 2.2 to one another with play and in a locking stage at least one of the locking devices 3.1 locks the upper and lower rails 2.1, 2.2 to one another in a play-free manner (without play).

The rocker-shaped positioning element 5.2 balances the guide elements 3.3 projecting at different heights on account of the pivotable bearing and comes into contact with both guide elements 3.3.

Figure 4:
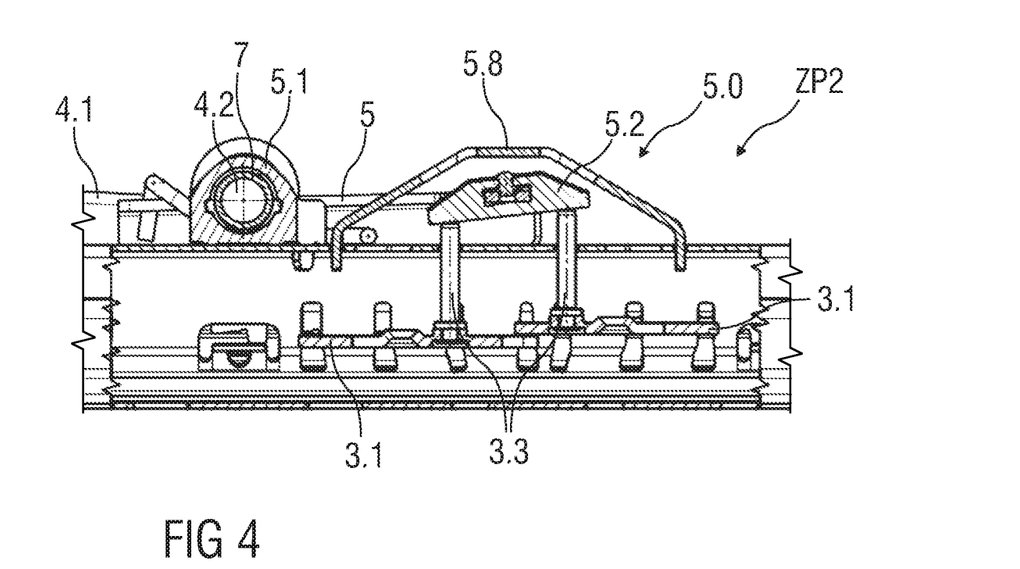
Figure 5:
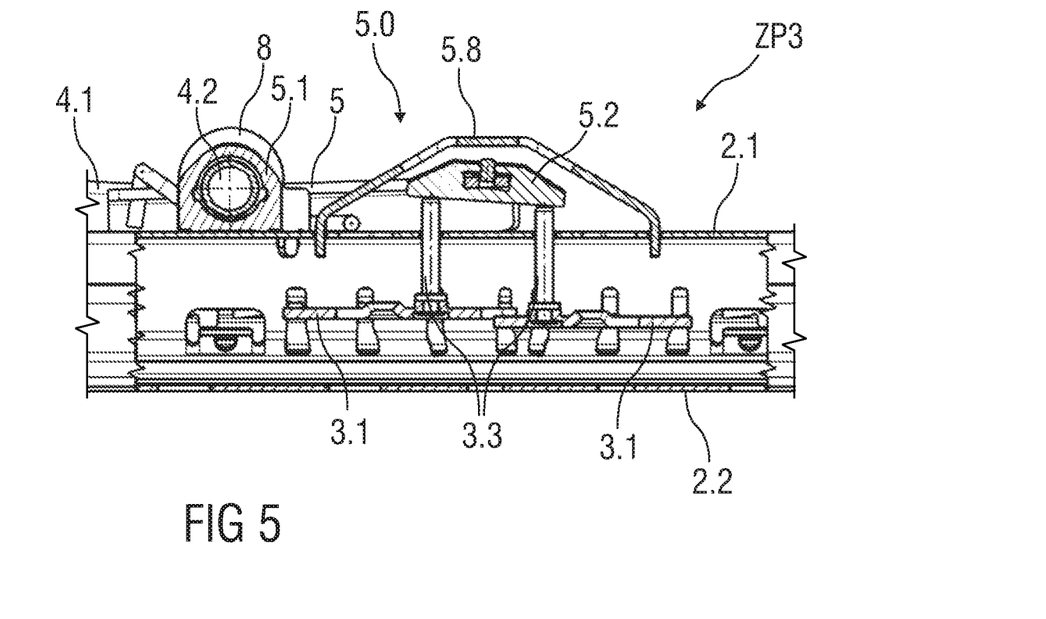

FIGS. 4 and 5 each show the positioning element 5.2 as a balancing rocker which strikes an angle or pivoting limit in FIG. 4 for a rear locking element 3.1 with a greater unlocking force and in FIG. 5 strikes an angle or pivoting limit for a front locking element 3.1 with a greater unlocking force.

Figure 6:
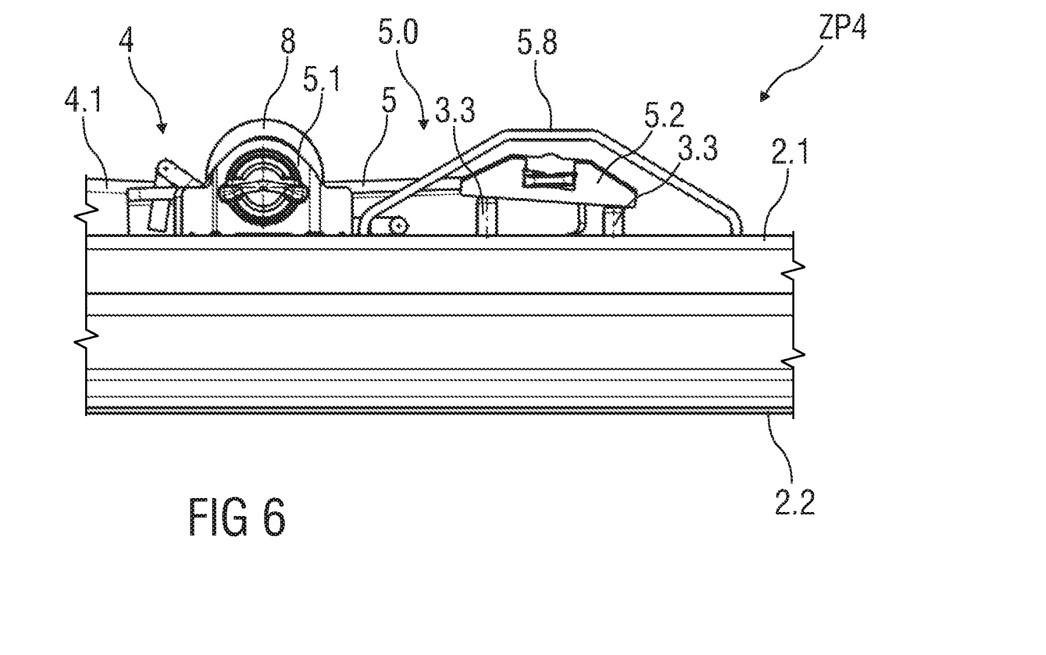

FIG. 6 shows a side view of the actuation mechanism 4 combined with the release mechanism 5.0, comprising the external release lever 5 and the rocker-shaped positioning element 5.2 which engages with the guide elements 3.3 during actuation of the actuation arm 4.1.

FIGS. 2 to 6 show an unlocking sequence during actuation of the actuation arm 4.1.

The rocker-shaped positioning element 5.2 is designed in such a manner that during actuation of the actuation arm 4.1 it centers the two locking elements 3.1 in respect of the locking position VP according to FIG. 2 and adjusts them largely to a straight line along a locking axis VA.

FIGS. 3 to 6 show intermediate positions ZP1 to ZP4 during the unlocking of the locking elements 3.1, in which these are placed in an oblique position with respect to a straight longitudinal axis LA due to the different unlocking force magnitudes. For this purpose, the through-openings 9 have a greater diameter than the diameters of the guide elements 3.3. The through-openings 9 may also be non-circular, in particular oval or slot-shaped. The guide elements 3.3 in this case and the through-openings 9 are set up in such a manner corresponding to one another that a tilting angle limitation of the locking elements 3.1 is caused.

Figure 7:
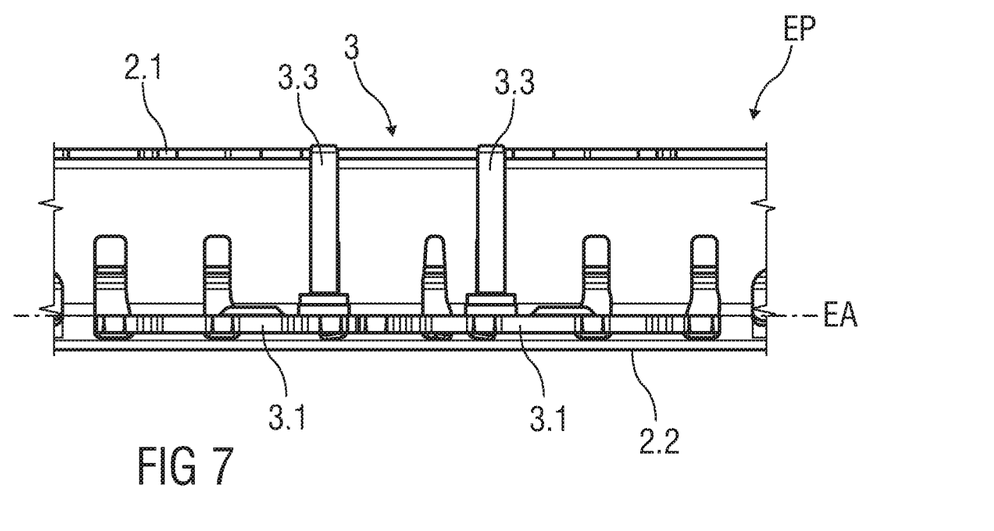

FIG. 7 shows the locking elements 3.1 in the unlocking position EP, in which they are centered, in other words symmetrically adjusted and positioned, substantially on a straight line along the unlocking axis EA by means of the positioning element 5.2 which cooperates with the guide elements 3.3.

Figure 8:
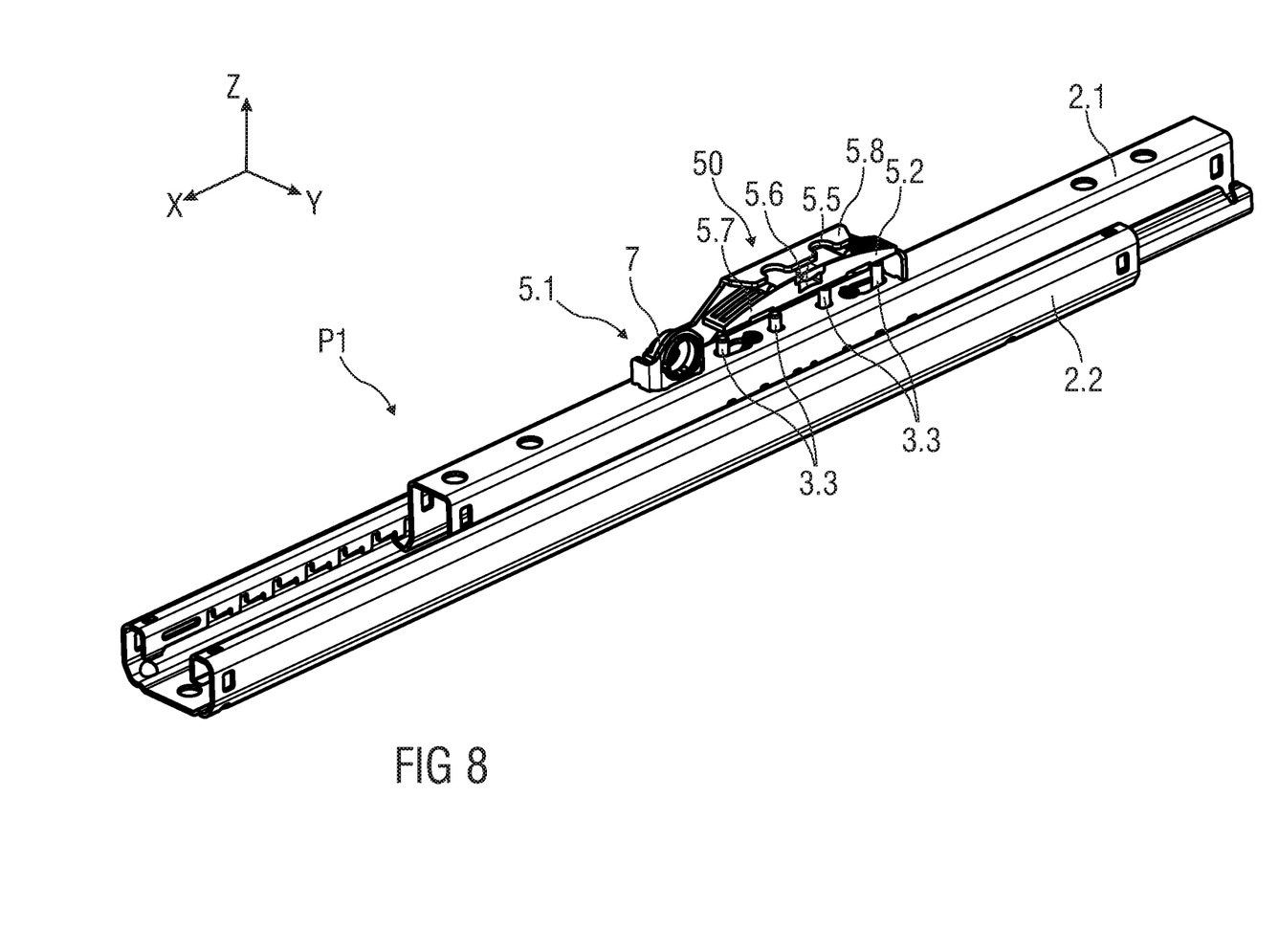
FIGS. 8 to 10 show schematically in different depictions a further embodiment for an improved actuation mechanism of a longitudinal adjuster.
Figure 9:
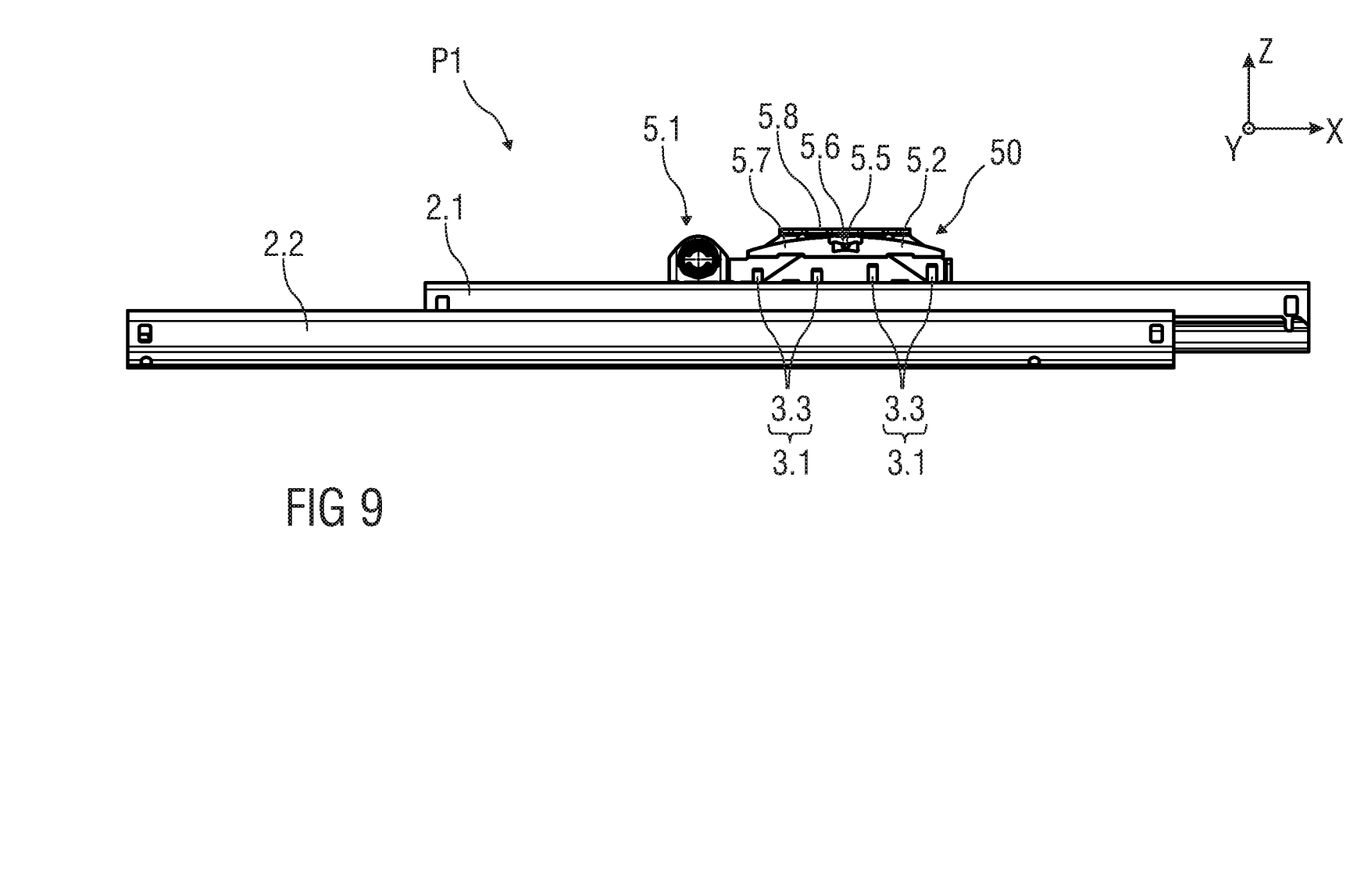
Figure 10:
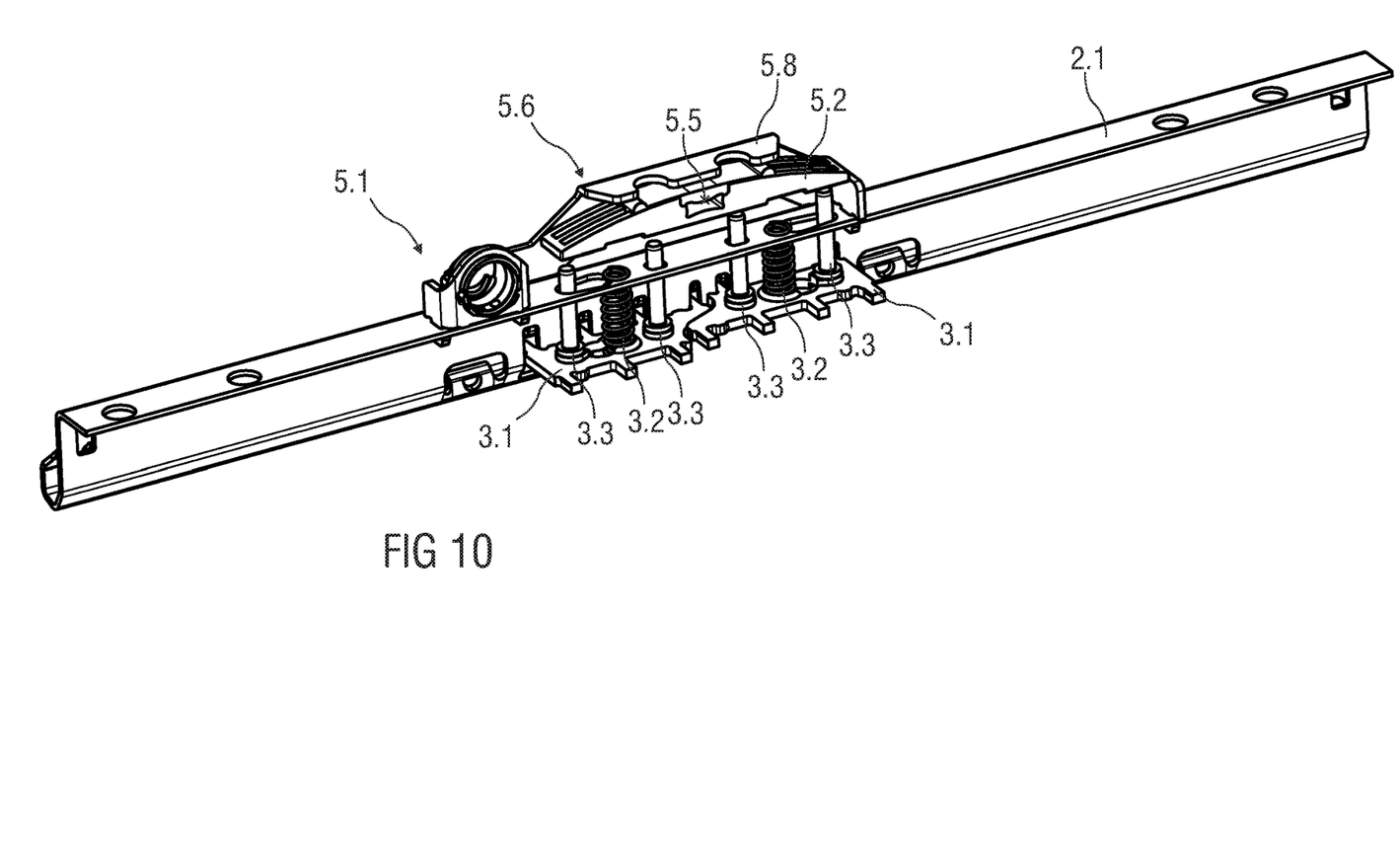

FIGS. 8 to 10 show a further embodiment of an alternative release mechanism 50 for the actuation mechanism 4 described above.

The release mechanism 50 is depicted for the pair of rails P1. The release mechanism 50 for the other pair of rails P2 is of similar design.

The release mechanism 50 differs from the release mechanism according to FIGS. 2 to 7 in the number of guide elements 3.3. Instead of one guide element 3.3 for each locking element 3.1, the release mechanism 50 has two guide elements 3.3 for each locking element 3.1. This means that the positioning element 5.2 and the release cover 5.8 are only extended in the longitudinal extent.

The release mechanism 50 is depicted without the release lever 5.

Otherwise, the components of the actuation mechanism 4 and the rail locking device 3 are similar to the components according to the exemplary embodiment in FIGS. 2 to 7.

The two guide elements 3.3 of the respective locking element 3.1 are arranged spaced apart from one another in the longitudinal extent. The spring 3.2, in particular a return spring, is arranged between the two guide elements 3.3 of each locking element 3.1.

The guide elements 3.3 of the two locking elements 3.1 in this case are spaced apart from the rotational axis or the articulated axle 5.5 of the positioning element 5.2, such that the positioning element 5.2 centers itself during unlocking.

The rocker-shaped positioning element 5.2 balances the guide elements 3.3 which project at different heights due to the pivotable mounting of the positioning element 5.2 and comes into contact with all guide elements 3.3 of all locking elements 3.1 during unlocking.

During unlocking via one of the guide elements 3.3 of one of the locking elements 3.1, this would initially tilt up to the tilting angle limiter due to the distance from the spring 3.2—a return spring, in particular a tension spring—for actuation and then be displaced up to the contact of the first locking tooth 11 with the stroke limiting stop in the upper rail 2.1 in the unlocking direction ER. From this point on, substantially higher unlocking forces would be required in order to press the locking element 3.1, and therefore the latching plate, completely against the stroke limiting stops.

By using the second guide element 3.3 for each locking element 3.1 (for example, latching plate), the two locking elements 3.1 are unlocked virtually in parallel due to the force equilibrium and at the same time pressed against the stroke stop in the upper rail 2.1.

Due to the different spacing of the guide elements 3.3, for example pins, of each locking element 3.1 from the rotational axis or articulated axle 5.5 of the positioning element 5.2, self-centering of the particularly rocker-shaped positioning element 5.2 takes place during the unlocking process. This allows the respective end position, in particular the locking position VP or unlocking position EP, to be reached virtually synchronously.

This synchronous reaching of the end positions (locking position VP or unlocking position EP) causes the greatest possible overtravel. The overtravel is measured from the locking position VP just unlocked to the completely unlocked unlocking position EP. This means that an angle stop in the positioning element 5.2 is not necessary.

The guide elements 3.3 of adjacent locking elements 3.1 in this case are arranged at an equal distance from the rotational axis or articulated axle 5.5 of the positioning element 5.2. In this way, the adjacent locking elements 3.1 are unlocked largely synchronously.

FIGS. 8 to 10 show the positioning element 5.2 as a balancing rocker which strikes an angle limiter or a pivoting limiter for a front locking element 3.1 with an increased unlocking force.

LIST OF REFERENCE NUMBERS

1 Longitudinal adjuster
2 Rail system
2.1, 2.2 Rails
2.3 Rail opening
3 Rail locking device
3.1 Locking elements
3.2 Spring
3.3 Guide element
4 Actuation mechanism
4.1 Actuation arm
4.2 Cross bar
5 Release lever
5.0, 50 Release mechanism
5.1 Attachment region
5.2 Positioning element
5.2.1 Elastic material
5.2.2 Rigid plastics material
5.3 Lever end
5.4 Opening
5.5 Articulated axle
5.6 Attachment region 5.7 Coupling region
5.8 Release cover
6 Recess
7 Bearing bushing
8 Spring element
9 Through-opening
10 Slot opening
11 Locking teeth
D Pivot point
EA Unlocking axis
ER Unlocking direction
EP Unlocking position
I Interior
LA Longitudinal axis
M Assembly unit
P1, P2 Pair of rails
VA Locking axis
VP Locking position
X Longitudinal direction
ZP1 to ZP4 Intermediate position

The invention claimed is:

1. An actuation mechanism for a longitudinal adjuster of a vehicle seat comprising:
   at least one actuation arm,
   a release lever, and
   a positioning element which is arranged on the release lever and which is pivotably mounted on a free lever end of the release lever,
   wherein the positioning element is formed as a two-component part comprising an internal elastomeric material that is overcoated by a rigid plastic material.

2. The actuation mechanism as claimed in claim 1, wherein the positioning element is configured in the form of a rocker.

3. The actuation mechanism as claimed in claim 1, wherein the actuation arm, the release lever and the positioning element are preassemblable into an assembly unit.

4. The longitudinal adjuster as claimed in claim 1, wherein the positioning element has a connection area in the area of the inner elastomeric material which is configured to fix the positioning element to the release lever in a form-fitting and/or force-fitting manner.

5. A longitudinal adjuster for a vehicle seat comprising an upper rail and a lower rail which are lockable to one another via at least two locking elements, and an actuation mechanism as claimed in claim 1 for actuation of the locking elements.

6. The longitudinal adjuster as claimed in claim 5, wherein the positioning element is arranged outside the rails and is operatively connected to at least one guide element arranged in the interior between the rails.

7. The longitudinal adjuster as claimed in claim 6, wherein the locking elements are forcibly guided during unlocking or locking via the guide element in the upper rail to prevent tilting.

8. The longitudinal adjuster as claimed in claim 7, wherein two guide elements are provided for each locking element.

9. The longitudinal adjuster as claimed in claim 8, wherein the guide elements of the respective locking element are spaced apart from a rotational axis or articulated axle of the positioning element in such a manner that the positioning element centers itself when unlocking.

* * * * *